US009294294B2

(12) United States Patent
de Bruin et al.

(10) Patent No.: US 9,294,294 B2
(45) Date of Patent: Mar. 22, 2016

(54) METHOD AND ARRANGEMENT FOR EFFICIENT GROUP COMMUNICATION

(75) Inventors: Peter de Bruin, Gammelstad (SE); Hans Hannu, Lulea (SE); Paul Schliwa-Bertling, Ljungsbro (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1365 days.

(21) Appl. No.: 12/677,117

(22) PCT Filed: Sep. 11, 2007

(86) PCT No.: PCT/SE2007/050646
§ 371 (c)(1),
(2), (4) Date: Mar. 9, 2010

(87) PCT Pub. No.: WO2009/035385
PCT Pub. Date: Mar. 19, 2009

(65) Prior Publication Data
US 2010/0329169 A1    Dec. 30, 2010

(51) Int. Cl.
  *H04H 20/71*   (2008.01)
  *H04L 12/18*   (2006.01)
  *H04W 4/06*    (2009.01)
  *H04W 60/00*   (2009.01)
  *H04W 68/02*   (2009.01)

(52) U.S. Cl.
  CPC ........... *H04L 12/1886* (2013.01); *H04L 12/185* (2013.01); *H04L 12/189* (2013.01); *H04W 4/06* (2013.01); *H04W 60/00* (2013.01); *H04W 68/02* (2013.01)

(58) Field of Classification Search
  CPC .................................................. H04W 72/005
  See application file for complete search history.

(56) References Cited

U.S. PATENT DOCUMENTS

| | | | | |
|---|---|---|---|---|
| 6,243,579 | B1 * | 6/2001 | Kari | 455/426.1 |
| 2004/0203894 | A1 * | 10/2004 | Watanabe et al. | 455/456.1 |
| 2004/0229629 | A1 * | 11/2004 | Yi et al. | 455/452.2 |
| 2005/0239471 | A1 * | 10/2005 | Babovic | 455/452.2 |
| 2007/0015523 | A1 * | 1/2007 | Prakash et al. | 455/458 |
| 2007/0032234 | A1 * | 2/2007 | Jain et al. | 455/435.1 |
| 2007/0105567 | A1 | 5/2007 | Mohanty et al. | |
| 2007/0202879 | A1 * | 8/2007 | Bae et al. | 455/436 |
| 2007/0249282 | A1 * | 10/2007 | Shaheen | 455/3.06 |
| 2009/0080354 | A1 * | 3/2009 | Shin et al. | 370/312 |

FOREIGN PATENT DOCUMENTS

| | | |
|---|---|---|
| WO | 97/24898 | 7/1997 |
| WO | 00/01173 | 1/2000 |
| WO | 2007/052888 A2 | 5/2007 |

OTHER PUBLICATIONS

3rd Generation Partnership Project. "Paging Optimization in Overlapping Area." 3GPP TSG SA WG2 Architecture—S2@SAEAdHoc, S2H060329, Apr. 3-6, 2006, Paris, France.

* cited by examiner

*Primary Examiner* — Samina Choudhry
(74) *Attorney, Agent, or Firm* — Coats & Bennett, P.L.L.C.

(57) ABSTRACT

In a method of enabling improved group communication for a plurality of mobile terminals MT participating in a multicast session in a communication system comprising a plurality of cells and at least two base station systems with corresponding cell coverage, reducing S1 mandatory paging signalling from said mobile terminals and said network, by maintaining said network and said mobile terminals in an active state, and limiting S2 cell update signalling in response to one of said plurality of mobile terminal moving from one cell to a new cell.

22 Claims, 13 Drawing Sheets

MM CONTEXT

MBMS CONTEXT

| CELL IDENTITY | #MOBILES |
|---|---|
| 6BTA | 2 |
| 3XICA | 6 |

*FIG. 6*

METHOD AND ARRANGEMENT FOR EFFICIENT GROUP COMMUNICATION

TECHNICAL FIELD

The present invention relates to group communication in telecommunication systems, especially to improved group communication for multicast sessions in multimedia broadcast multicast service enabled telecommunication systems.

BACKGROUND

The cellular industry is constantly seeking new ways for improving how people are able to communicate. With the introduction of EDGE (Enhanced Data rates for GSM Evolution) technology for GSM (Global System for Mobile communication) and the HSPA (High-Speed Packet Access) for WCDMA (Wideband Code Division Multiple Access) the data communication in cellular terminals has reached new heights. The so-called IMS (IP Multimedia Subsystem) has given new opportunities to create additional interesting IP (Internet Protocol) based services, such as Push-to-talk Over Cellular (PoC). MBMS (Multimedia Broadcast Multicast Service) [1] is yet another feature that allows for efficient deployment of broadcast and multicast services, such as mobile TV or PoC group communication. This is a fact since MBMS offers true broadcast and multicast even over the radio. For example users, or actually the mobile terminals, in e.g. GSM/(E)GPRS would listen to the same time slots carrying the MBMS data channel Basically, MBMS (Multimedia Broadcast Multicast Service) is an IP datacast (IPDC) type of service that can be offered by e.g. GSM and UMTS cellular networks. The infrastructure of those networks gives the possibility to use an uplink channel for the interaction between the service and the user or mobile terminal. A broadcast service can be generalized to mean a unidirectional point-to-multipoint service in which data is transmitted from a single source to multiple mobile terminals (MT) in an associated broadcast service area. In other words, broadcast services can be called push-to-talk-type services. On the other hand, a Multicast Service can be defined as a unidirectional point-to-multipoint service in which data is transmitted from a single source to a multicast group in its associated multicast service area. Only the users that are subscribed to the specific multicast service and have joined the multicast group associated with the service can receive the Multicast Services.

With the above in mind, and the fact that an important part of Public Mobile Radio and Public Safety Radio (PMR/PSR) services is group communication, it is obvious that cellular systems used for traditional mobile tele- and data communication are potentially developing into highly attractive alternatives to the analogue PMR/PSR systems, used by e.g. police departments, fire departments and security and transport companies.

In essence, group communication as it will be used in this disclosure concerns mainly multicast sessions where one user speaks or transmits information e.g. data files, video broadcast etc. to a plurality of other users that merely listen or receive information. It is a highly asymmetrical service where the speaking user only uses a small uplink resource, whereas the listeners collectively use many downlink resources. Especially, the situation where a large group of listening or subscribing users or mobile terminals are located within a same limited area or geographical location, e.g. construction site, residential area, coffee shop, accident site, airport etc. The speaker wants to transmit crucial information in an efficient manner.

One service included in a PMR system based on commercial available cellular technologies, as given above, would be PoC using MBMS to support large communication groups. This would enable an attractive PMR/PSR service highly useful for example police, firefighters, taxi drivers etc.

However, there are a number of issues that needs to be resolved. One major issue is the resource consuming paging procedure that is necessary in order to locate the various mobile terminals participating in a multicast session. Especially, for relatively large number of mobile terminals subscribing to a multicast session. Each mobile terminal receives a paging message from the network and is required to respond in order to provide location information, e.g. in which cell or to which node in the network the mobile terminal is currently located. The paging message from the network consumes little resources, but a large number of mobile terminals each responding to the paging message consumes plenty. One of the consequences is the introduction of delay since the network needs to wait for all subscribing mobile terminals to respond to the paging message.

Consequently, there is a need for methods and arrangements to reduce the paging introduced delay and enable efficient multicast group communication in a MBMS enabled network.

SUMMARY

An object with the present invention is to enable an improved multiple broadcast multicast service in a telecommunication system.

A further object with the present invention is to enable improved group communication.

Another object with the present invention is to enable efficient multicast group communication.

These and other objects are achieved according to the attached set of claims.

Basically, in a method for enabling improved group communication in a communication system comprising a plurality of mobile terminals participating in a multicast session, and at least two base stations with corresponding cell coverage, reducing (S1) mandatory paging signaling between the mobile terminals and the network by maintaining the network and mobile terminals in an active state throughout the multicast session, and limiting (S2) cell update signaling in response to one of the mobile terminals moving from one cell to a new cell.

Advantages of the present invention include:
reduced PMR/PSR service latency
reduced uplink traffic due to limited cell update signaling
efficient group communication services over multicast in large groups.

BRIEF DESCRIPTION OF THE DRAWINGS

The invention, together with further objects and advantages thereof, may best be understood by referring to the following description taken together with the accompanying drawings, in which:

FIG. 6 is a schematic illustration of the extended MM context according to the invention;

ABBREVIATIONS

BSC Base Station Controller
BSS Base Station Subsystem
EDGE Enhanced Data rates for GSM Evolution
GERAN GSM EDGE Radio Access Network
GSM Global System for Mobile communication
GSN GPRS Support Nodes
HSPA High-Speed Packet Access
IMS IP Multimedia Subsystem
ICMP Internal Control Message Protocol
IP Internet Protocol
LLC Logical Link Control
LTE Long-Time Evolution
MBMS Multimedia Broadcast Multicast Service
MM Mobility Management
MT Mobile Terminal
NACC Network Assisted Cell Change
PACCH Packet Associated Control Channel
PCU Packet Control Unit
PDU Protocol Data Unit
PMR Public Mobile Radio
PoC Push to talk Over Cellular
PSR Public Safety Radio
RR Radio Resources
SGSN Servicing GPRS Support Nodes
WCDMA Wideband Code Division Multiple Access

DETAILED DESCRIPTION

The present invention will be described in the context of MBMS in a GERAN GSM/EDGE network; however, it is evident that the embodiments of the invention can be applied in any communication system in which MBMS can be implemented. Examples of other technologies in which the present invention can be utilized are, LTE, WCDMA etc.

Figure 1:
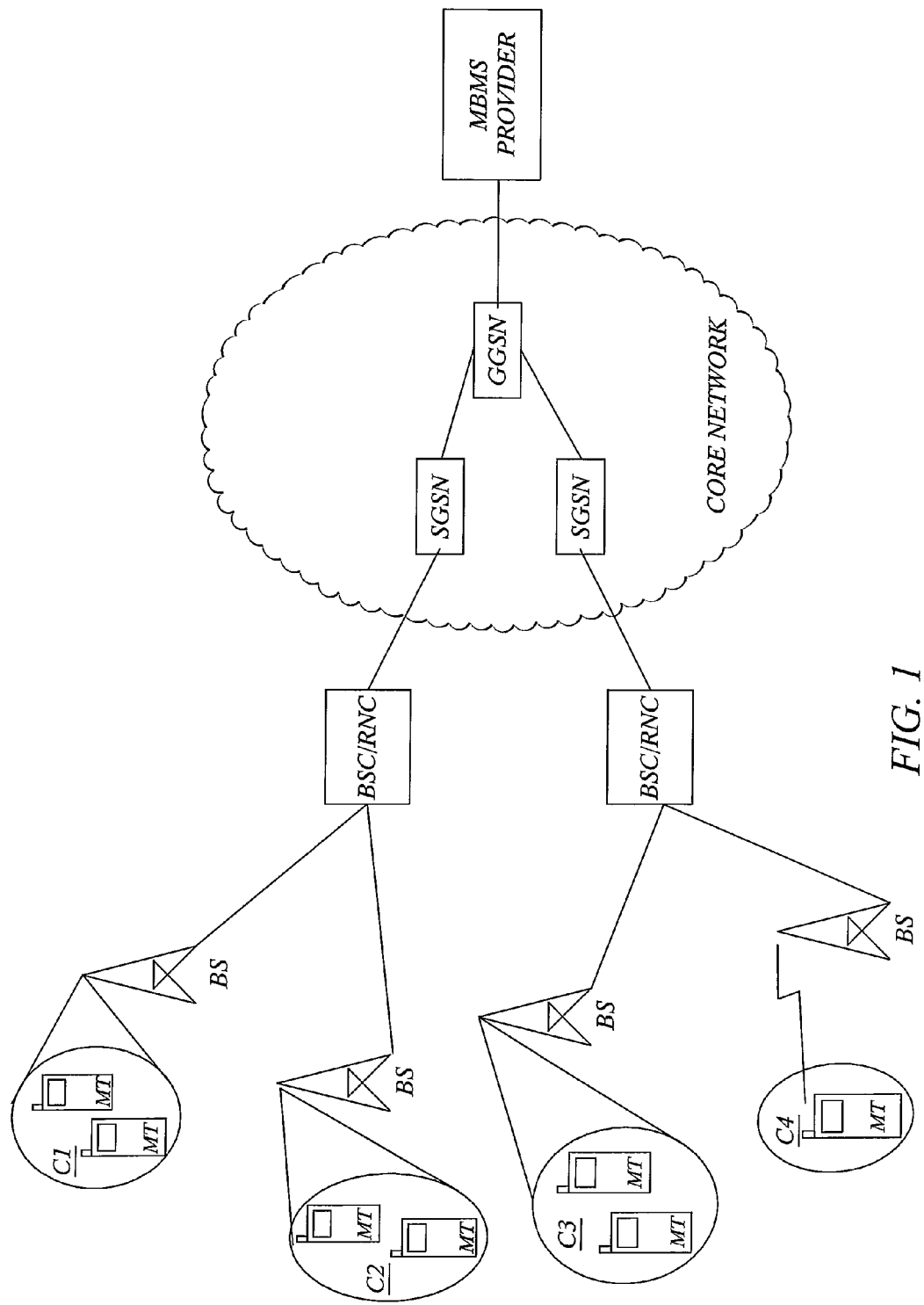
FIG. 1 is a general communication network where the present invention can be implemented.

With reference to FIG. 1 a general outline of a MBMS enabling communication system is shown and described. The system comprises a plurality of mobile terminals MT located in various cells (C1, C2, C3, C4), each cell associated with a respective base station BS, base station subsystem BSS or Node B. The base stations BS are arranged to a number of base station controller BSC nodes or radio network controller RNC nodes (depending on the technology used). Each controller node communicates with the core network, which among other devices comprises a plurality of SGSN (Serving GPRS Support Node), all connected to a common GGSN (Gateway GPRS Support Node). Finally, the core network receives content from one or more broadcast multicast service providers, e.g. a broadcast multicast service center BM-SC. Different services are provided in different areas using broadcast in cells 1-3. In cell 4 unicast is used as there is only single user subscribing to the MBMS service in that cell.

For MBMS the packet switched domain of the core network is used. The core network decides whether to use a broadcast bearer or a multicast bearer. In case of broadcast bearers the network does not know the identity of mobile terminals receiving the information, whereas for the multicast bearers this is known in the core network. Thus, the terminals do not need to inform the core network of their intentions when receiving a service that uses broadcast bearers, whereas when receiving a service that is using a multicast bearer the terminals need to inform the core network of its intention to use the service, i.e. subscribe to the service.

To further lay the ground for the description of the present invention, a brief discussion about prior art and problems thereof follows below.

Figure 2:
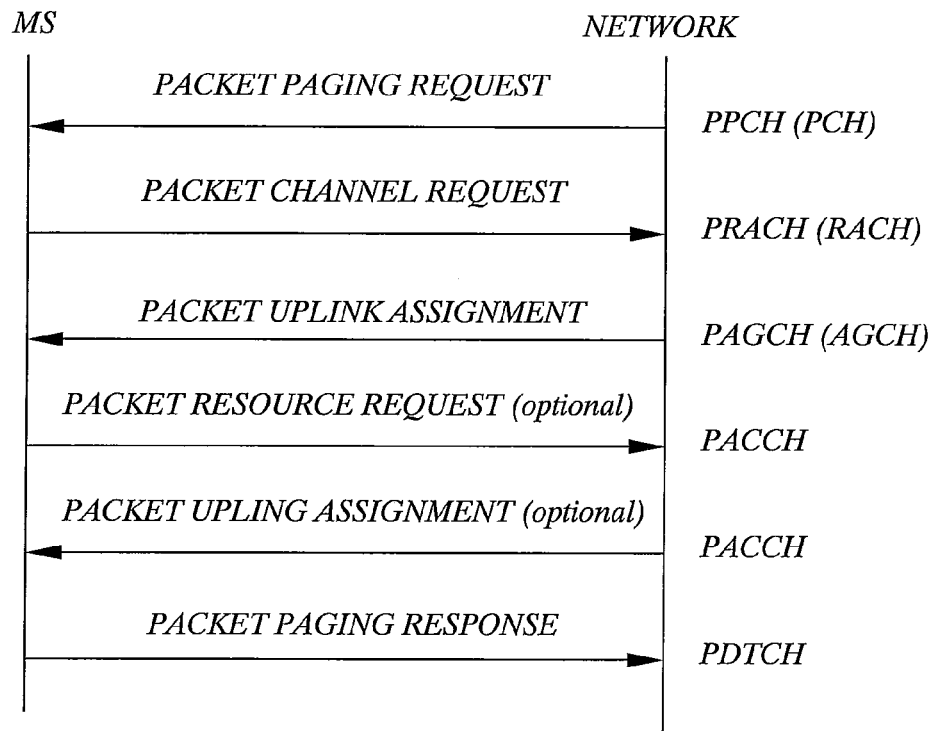
FIG. 2 is a schematic signaling diagram of prior art paging.

In GSM/EDGE networks, the network initiates the paging procedure when data to the mobile terminal is received in the GSN nodes. A paging message is generated in each cell of the routing area of the mobile terminals last known location. Hence, paging is conducted when the SGSN is in an idle state e.g. the so-called Mobility Management (MM) context in the SGSN is in the Standby state. When the MM context is in an active state, also referred to as the Ready state, the location of the terminal is known on a cell level. The paging signaling procedure is illustrated in FIG. 2. This procedure is repeated for every mobile terminal subscribing to the multicast session.

For an example with PMR/PSR group communication, the paging procedure is done individually for each mobile in a PoC group for the network to know in which cells to setup (MBMS) radio channels.

As said, paging is not performed if the MM context is in a Ready state. However, when the mobile terminal moves between the coverage of different cells a cell update procedure is initiated after a cell reselection. In packet idle mode the cell reselection is done autonomously by the mobile terminal. In packet transfer mode there are three network control modes (NC0, NC1, NC2). In NC0 the mobile terminal does as in packet idle mode. In NC1 the mobile behaves as in NC0, but in addition it also transmits periodical measurement of signal strengths from different cells. With NC2 it is the network that controls when the mobile performs a cell reselection. With NACC, the network sends neighbor cell system information, which the mobile terminal can use when it makes the initial access to the new cell. This allows for a minor interruption in an ongoing service (a few hundred milliseconds) in packet transfer mode.

Figure 3:
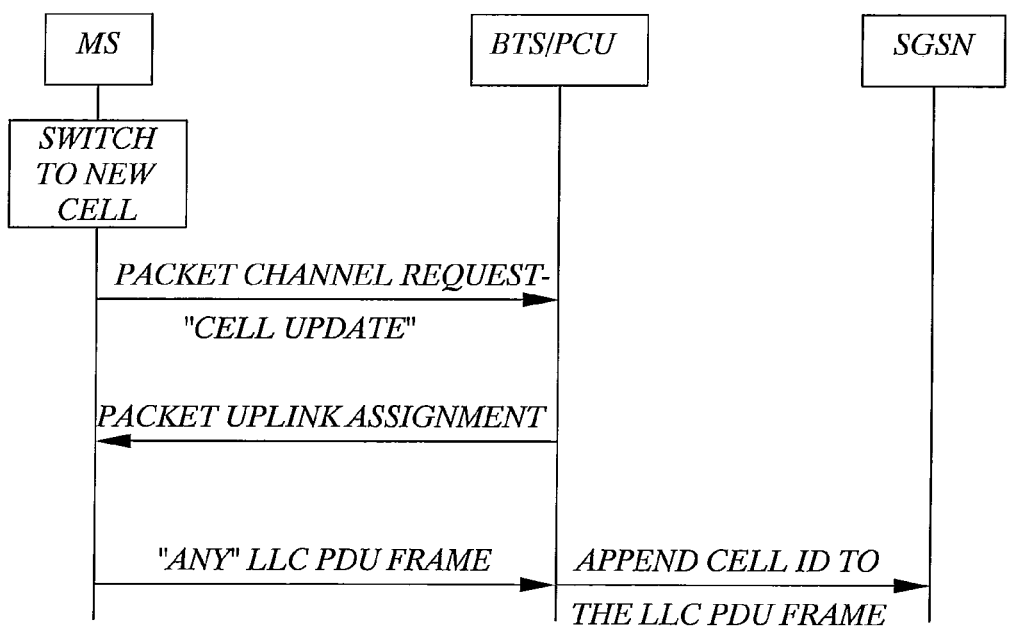
FIG. 3 is a schematic signaling diagram of prior art cell updating.

Still, when the mobile terminal has switched to the new cell it (individually) informs the network of its new position. See FIG. 3 for the cell update signaling procedure. The PCU appends the cell identity to the LLC frame before it is forwarded to the SGSN. The SGSN can then release resources, e.g. connections to a previous used BSC, which are no longer needed.

Two major issues are long experienced user delay due to paging and congestion in the Base Station Subsystems (BSS) due to cell updates. Due to the above-described mechanisms service latency is introduced to the multicast service or session. In short, the mandatory paging introduces unwanted delay and the cell update procedure introduces uplink traffic which may cause congestion in large group communications over MBMS.

Paging is necessary to perform for the SGSN to send received data towards a correct BSC. However, for a PSR voice service (or PoC, or any conversational service) the experienced user delay is crucial. Hence, the delay must be kept at a minimum, especially for a situation where the multicast session concerns an accident site, a fire or similar location. Consequently, the mandatory paging must be limited or reduced as far as possible. Furthermore, since the paging is performed by unicast for each participating mobile terminal the delay in a large PSR group may be considerable before all users have received and responded to the paging data. To enable efficient group communication it is therefore necessary to limit the amount of mandatory paging.

According to one aspect of the present invention, the paging signaling can be reduced by preventing the network and mobile terminals from leaving their active state, i.e. maintaining the active state or e.g. Ready State for a particular system. Specifically, the MM state or context of the communication system is kept at Ready.

However, maintaining the mobile terminals in their active state may cause a considerably large number of cell updates. In particular, for group communication with a large number of uplink users in the same cell, this could potentially cause uplink congestion and blocking in the BSS.

Figure 4:
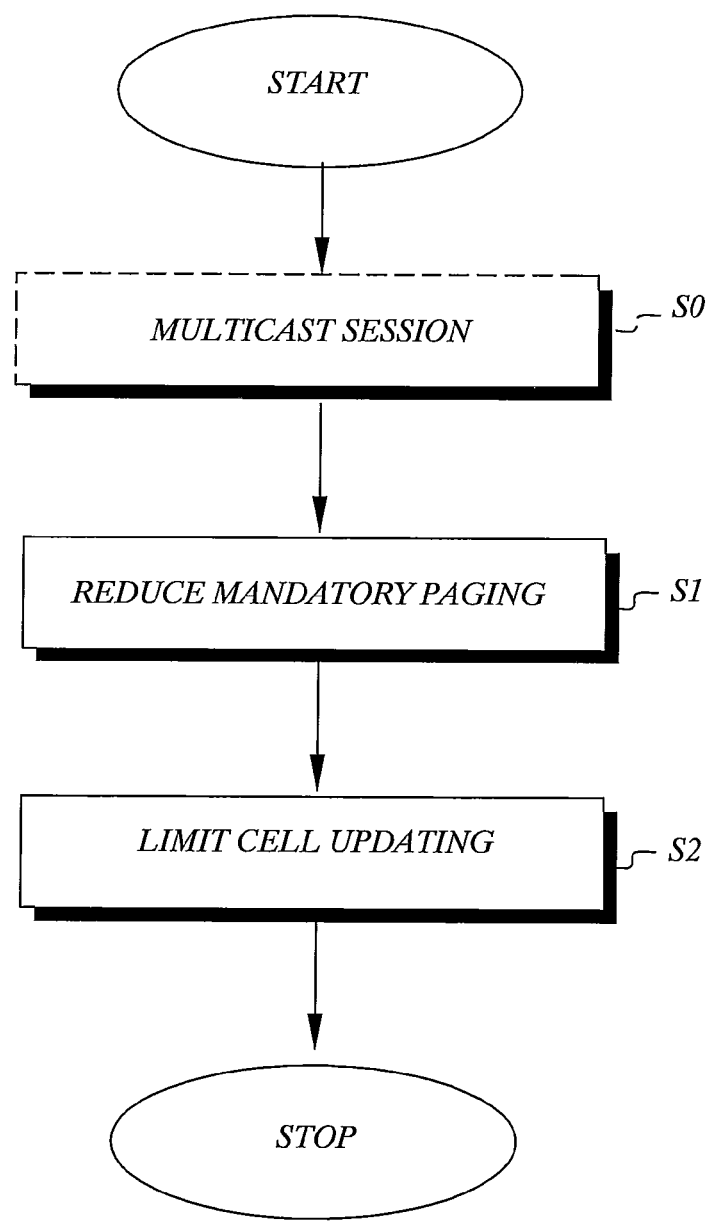
FIG. 4 is a schematic flow diagram of an embodiment of a method according to the present invention.

Thus, with reference to FIG. 4, the present invention provides a solution to both of these closely related problems, by the combined steps of reducing the mandatory paging signaling S1 by maintaining the network and mobile terminals in a ready state and by limiting S2 the cell updating procedures in response to a mobile terminal moving into a new cell in the network.

Figure 5:
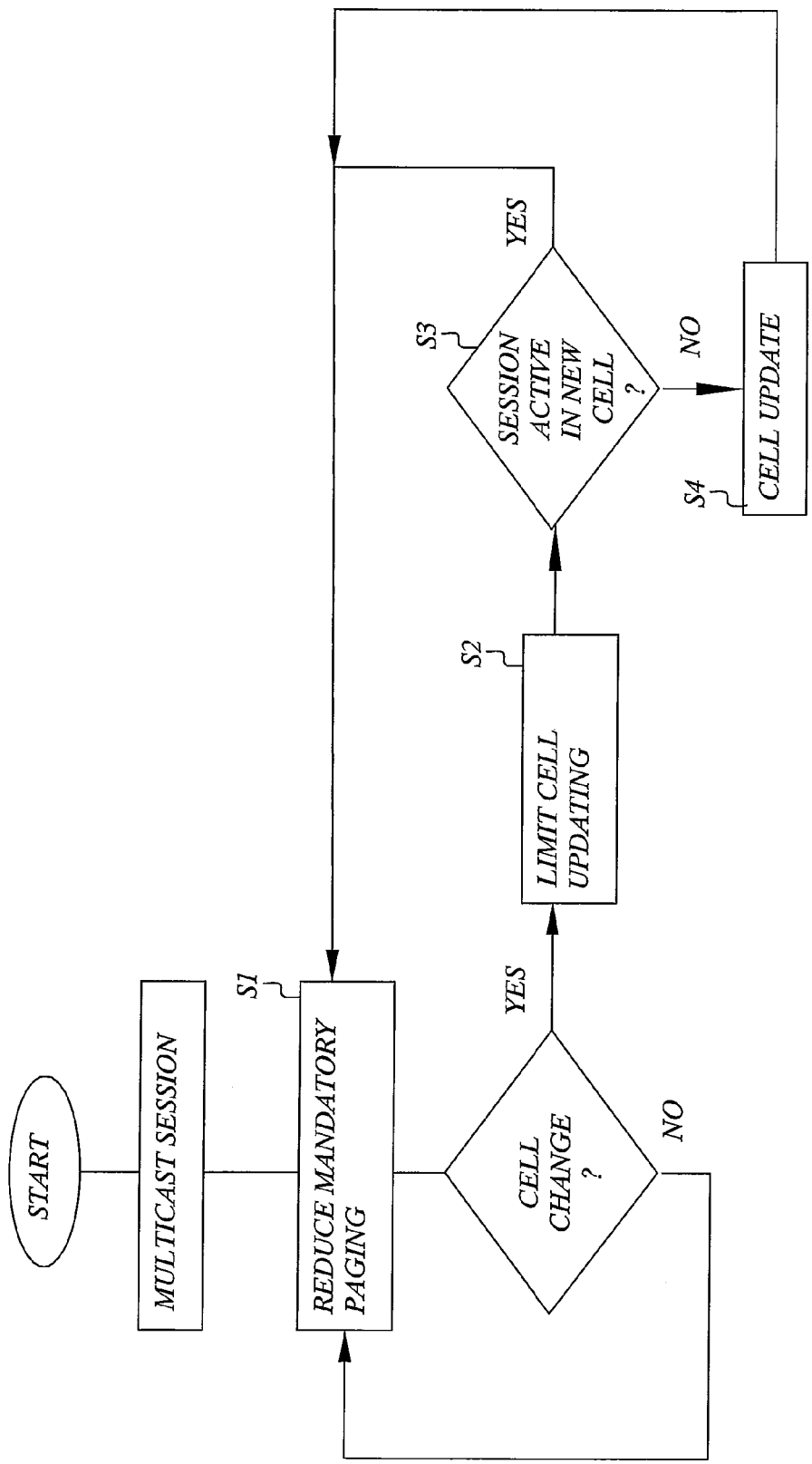
FIG. 5 is a schematic flow diagram of a further embodiment of a method according to the present invention.

With reference to FIG. 5, in its most basic form an embodiment of the present invention a multicast session with a plurality of participating mobile terminals is set up according to well known measures. To reduce S1 the mandatory paging signaling the invention maintains the network and the mobile terminals in an active state by prolonging a predetermined timer in SGSN or by letting the terminal transmit dummy messages. If one of the plurality of participating mobile terminals moves from the coverage of an initial cell to the coverage area of a new cell the method, according to the invention, limits cell updating signaling S2 by enabling the mobile terminal to perform a cell update only when it enters a cell where the MBMS session is not currently available according to received information. Consequently, according to a specific embodiment, the mobile terminal checks S3 if there is a active channel for the multicast session in the new cell, and performs a cell update S4 only if the test results in a negative statement, i.e. there is no active channel for the multicast session in the new cell.

According to another embodiment, to reduce the mandatory paging signaling, the mobile terminal and the SGSN MM context is kept in Ready state. This is preferably done by increasing the Ready timer to a maximum value and maintaining the Ready state throughout the duration of the multicast session. Optionally, and if necessary in case the maximum timer is not enough, dummy messages can be sent from the mobile terminal, e.g. a LLC PDU frame or ICMP message depending if it is a user application feature or integrated in the actual platform of the terminal. The dummy message would thus maintain the MM context in a Ready state. When the dummy messages (or any data) is received at the SGSN the MM context timer is reset, thus keeping the MM context in its active state or Ready state.

Keeping a mobile terminal in an active state can potentially negatively affect the battery life time of the mobile terminal. However, since the present invention is mainly intended for use in a PSR or PMR system, this does not present a problem as long as the battery can last at least a whole day.

As already stated, in order to avoid numerous cell update procedures the occasions when the mobile terminal shall perform a cell update is limited to only one occasion, namely when the mobile terminal enters a new cell where the MBMS session is not currently available according to received information. The received information is a record of in which cells the MBMS session is available. That particular information is received with the so called MBMS NEIGHBOURING CELL INFORMATION MESSAGE [2] which in a known manner is sent on the PACCH during MBMS transmission. Accordingly, the network will assign the MBMS session a channel in each cell where it sent last time plus in each new cell from which the network has received a cell update message originating from a mobile terminal subscribing or participating in said session. (Note that the network may use unicast transmission if it decides to instead of multicast transmission).

For the mobile terminal to know when the criteria for updating its position the MBMS context, which is part of the MM context, needs to be extended with additional information according to the present invention, namely the number of mobile terminals in a particular cell, as given in FIG. 6. Thus the MBMS context comprises an indication of the last known cells (for illustration purposes named 6BTA, 3XICA) participating in the multicast session, as well as the number of subscribing mobile terminals in each participating cell.

According to a particular embodiment of the present invention, the MBMS context of each mobile terminal is extended with records that consist of Cell identity: which is the identity of the cell where the NEIGHBOURING CELL INFORMATION MESSAGE indicated that the MBMS session is multicast. The network MM/MBMS context also contains the number of mobile terminals that are listening to the particular MBMS session and believed to be present in a particular cell or cells.

Figure 7:
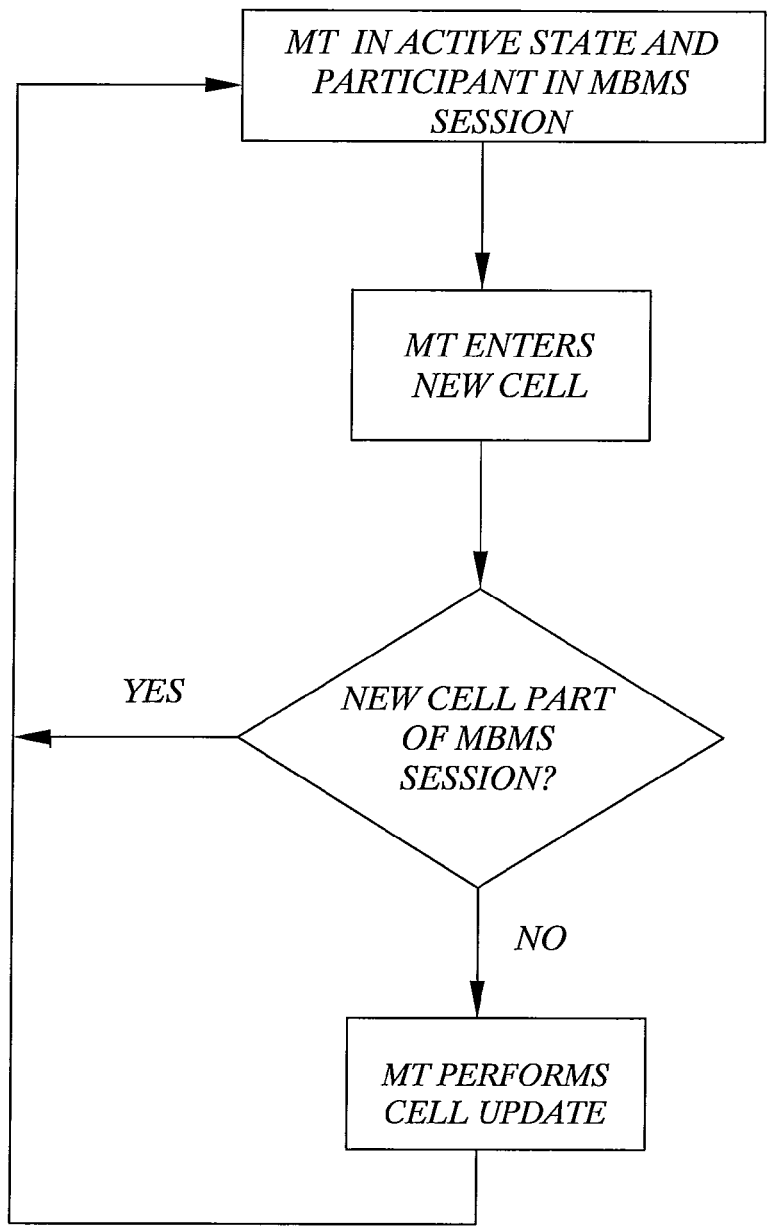
FIG. 7 is a schematic flow diagram of an embodiment of the method according to the present invention in a mobile terminal.

With reference to FIG. 7, the execution of the method according to the invention in a mobile terminal will be described. A mobile terminal MT is a subscriber to and joins a multicast session in the network. According to the previously described measures, the MM context of the mobile terminal MT is maintained in an active state e.g. Ready state, by means of either a Ready timer set to a maximum value or by transmitting dummy messages to the network when the timer has run out. The mobile terminal MT moves into the coverage of a new cell. Initially the mobile terminal MT needs to determine if there is an active channel for the multicast session in the new cell. If that is the case, the mobile terminal joins the active channel and takes part in the multicast session. If there is no active channel in the new cell, the mobile terminal initiates a cell update procedure to establish an active channel in the new cell.

The determination of if there is an active channel in the new cell can preferably be based on the indicated information in the extended MM context in the network and/or the mobile terminal MT. The MM context provides information concerning the identity of the cells last to be known to partake in the multicast session and the number of subscribing mobile terminals in each cell. This information is updated upon at least each cell updating procedure.

With reference to FIG. 8A-D and FIG. 9A-C various embodiments of the present invention in the network will be described.

Figure 8A:
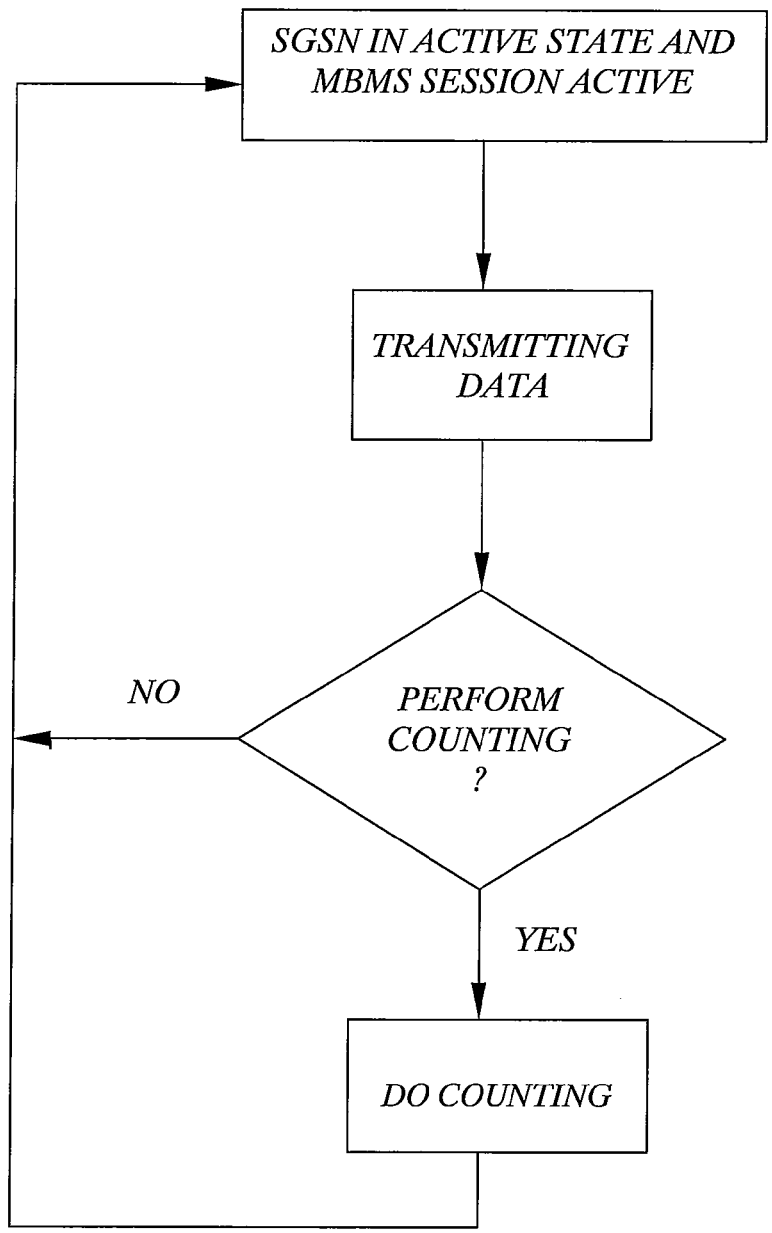
FIG. 8A-D are schematic flow diagrams of various embodiments of the present invention in the network.

According to one embodiment, with reference to FIG. 8A, the network shall also perform "MBMS counting" in the cells where the number of mobile terminals is below a given first threshold to see whether any mobiles are still within that cell. According to a further embodiment, the network shall strategically commence counting in cells also during MBMS transmission. This counting can be performed periodically in each cell and/or in neighbouring cells of a cell where the number of mobiles is below a given second threshold.

Figure 8B:
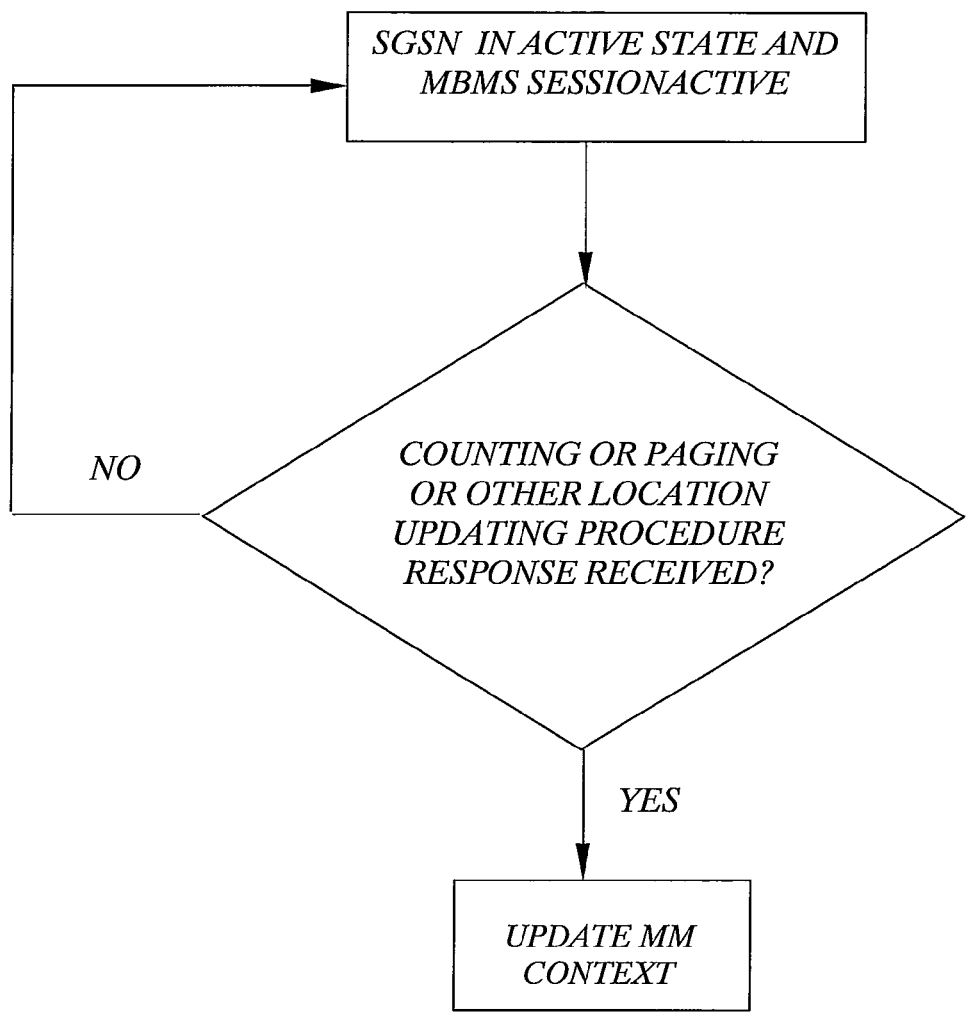

According to yet another embodiment, with reference to FIG. 8B, the network shall also perform paging or other location update procedures strategically, when the MBMS session has been idle, i.e. no data has been transmitted, during a given time period even though the mobiles are kept in Ready state. This in order to find out the cells where there are mobiles taking part of the MBMS session. MBMS dummy messages followed by counting may also be used. This "location update procedure" must however be used sparsely in order not to reduce the gain of the invention.

Figure 8C:
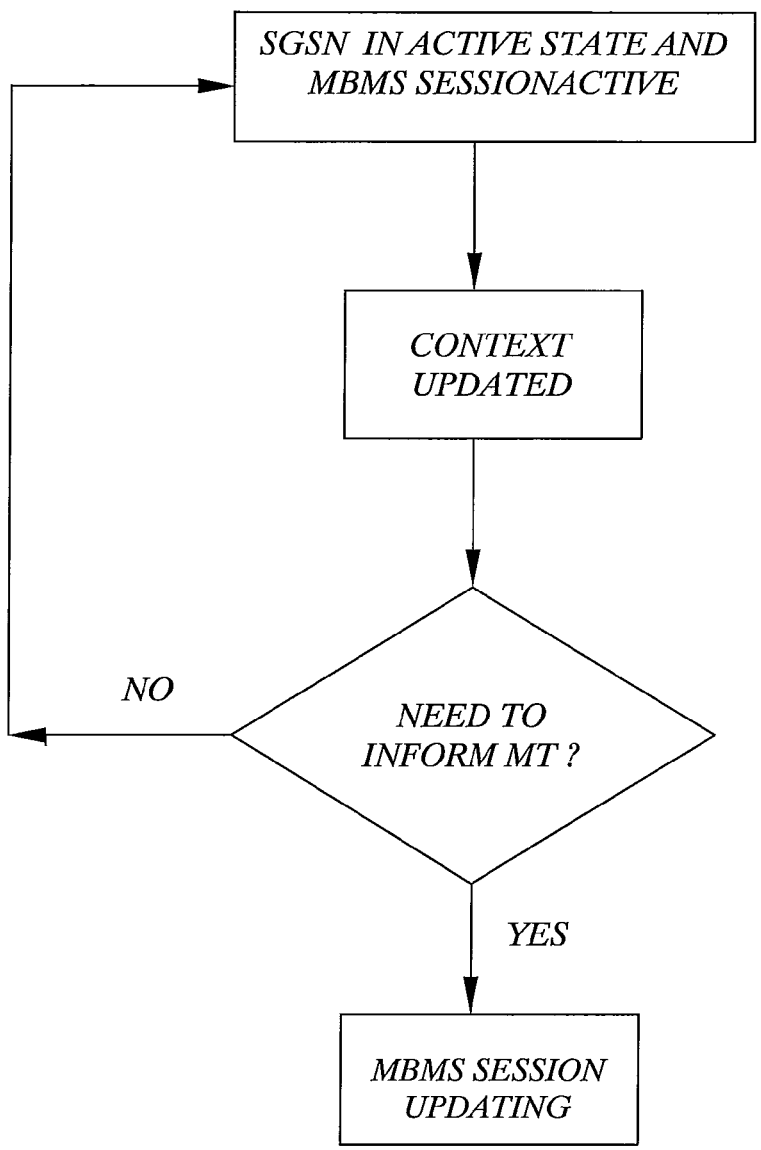

Further, with reference to FIG. 8C, if the network receives multiple cell updates (and consequently MM context update) for the same cell from mobiles taking part of the same MBMS session, the network should perform a MBMS session update procedure to inform the participating mobiles that the session is also available in the new cell (it would indicate in all cells where the MBMS session is available).

Figure 8D:
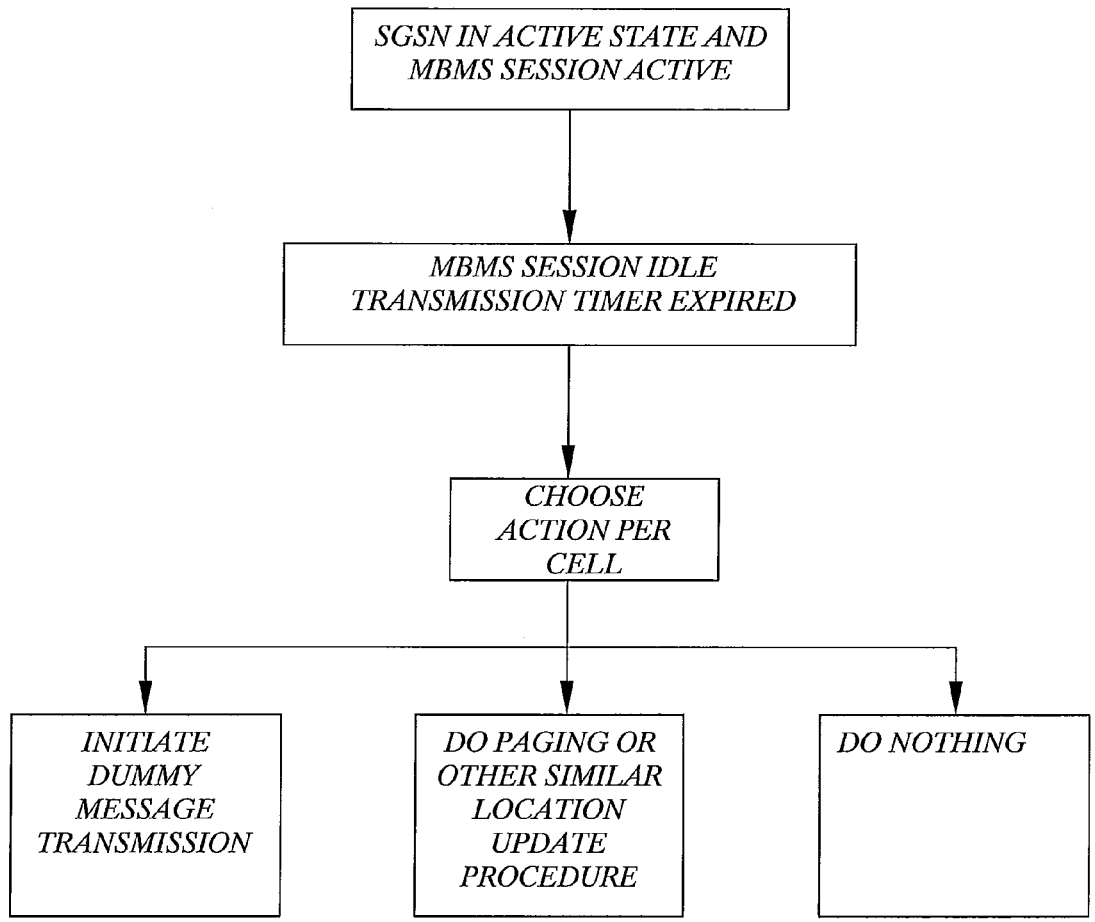

With reference to FIG. 8D, if no data has been transmitted in the multicast session for a predetermined time, i.e. the MBMS session idle transmission timer has expired there is a situation where the network can chose what measures to take for each participating cell. According to a first alternative, there is still need for the session to be active e.g. there is still a fire going on. Therefore the network might still need to keep the MM context updated with information of which cells are participating and how many subscribing mobile terminals MT that are located in each cell. In a first scenario, the network only strives to keep itself and the mobile terminals in an active state, and therefore send dummy messages to all subscribing mobile terminals. In a second scenario, the network initiates paging or other location update procedures to update the MM context with recent information. Finally, the network does nothing and the SGSN goes into an idle state.

Figure 9A:
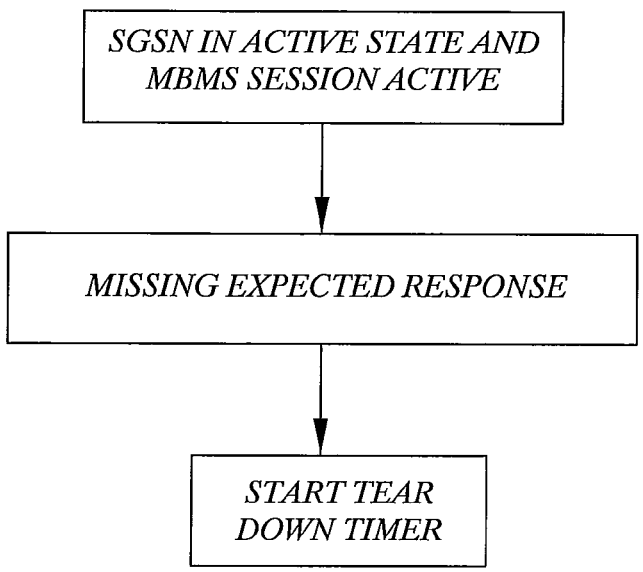
FIG. 9A-C are schematic flow diagrams of various embodiments of the present invention in the network.

With reference to FIG. 9A, in case that the network does not receive an expected response from a mobile terminal MT or user equipment that may be located within a particular cell on a given request (such as counting) it should start a tear down timer.

Figure 9B:
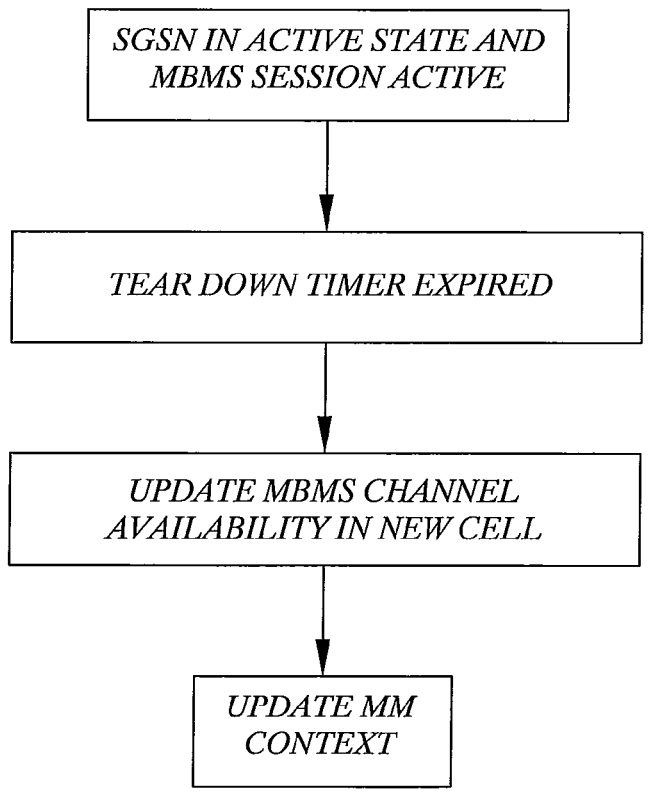

With reference to FIG. 9B, as the tear down timer expires the MBMS session is disrupted in that particular cell, unless the tear down timer has been reset by some later response. In the case that the MBMS session is disrupted/closed in the particular cell the network updates the MBMS channel availability in the network.

Figure 9C:
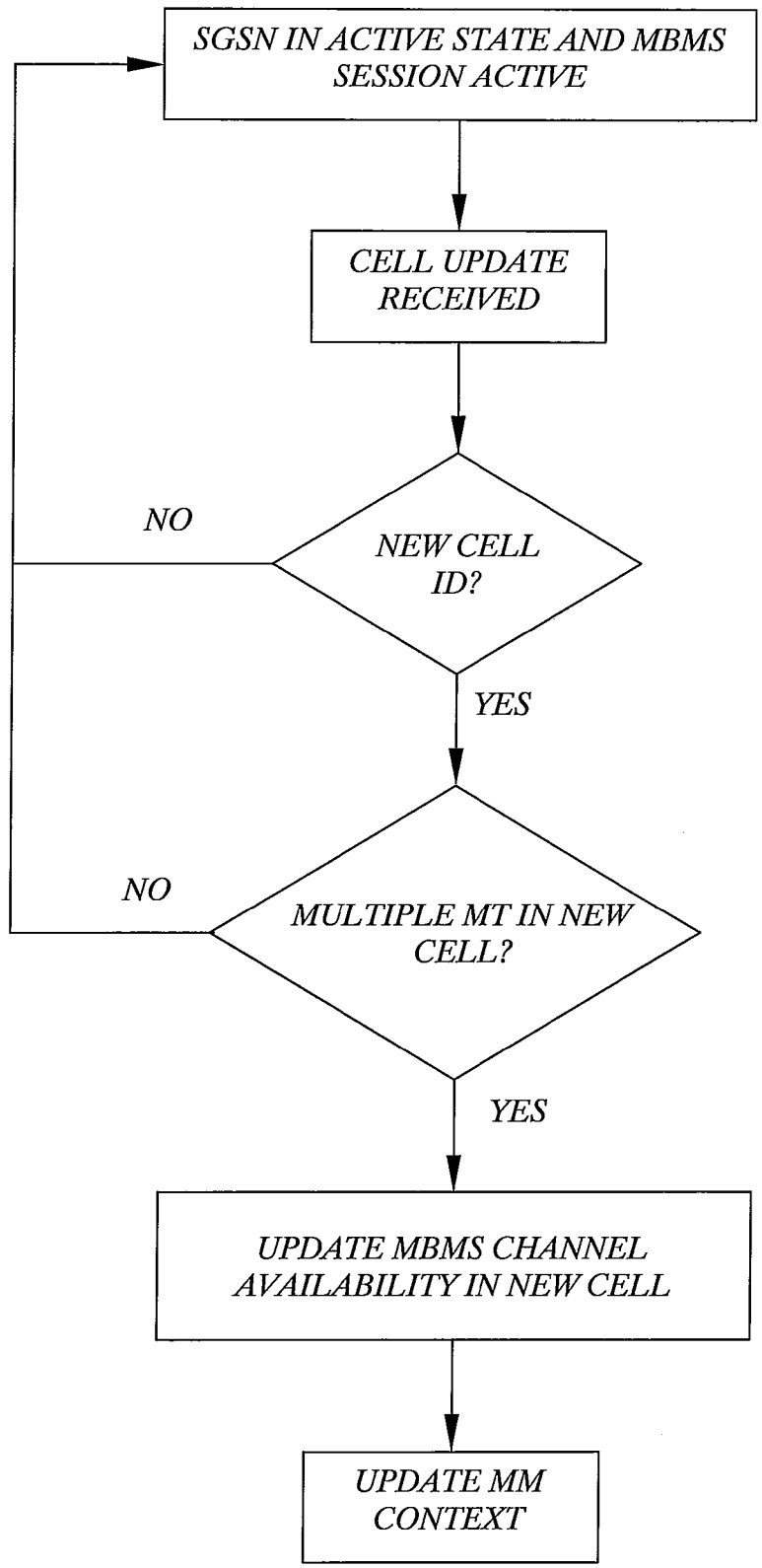

With reference to FIG. 9C, as the network receives a cell update it checks whether it contains a new cell id, i.e. one that is not part of the MM MBMS context cell id part. If multiple mobile terminals MT are within in that cell or that the network sets up a MBMS channel in the new cell, the network can optionally setup MSMS channels in the new cell even if there is only one MT within that cell, it then updates the MBMS channel availability in that cell, and also the MM context.

Figure 10:
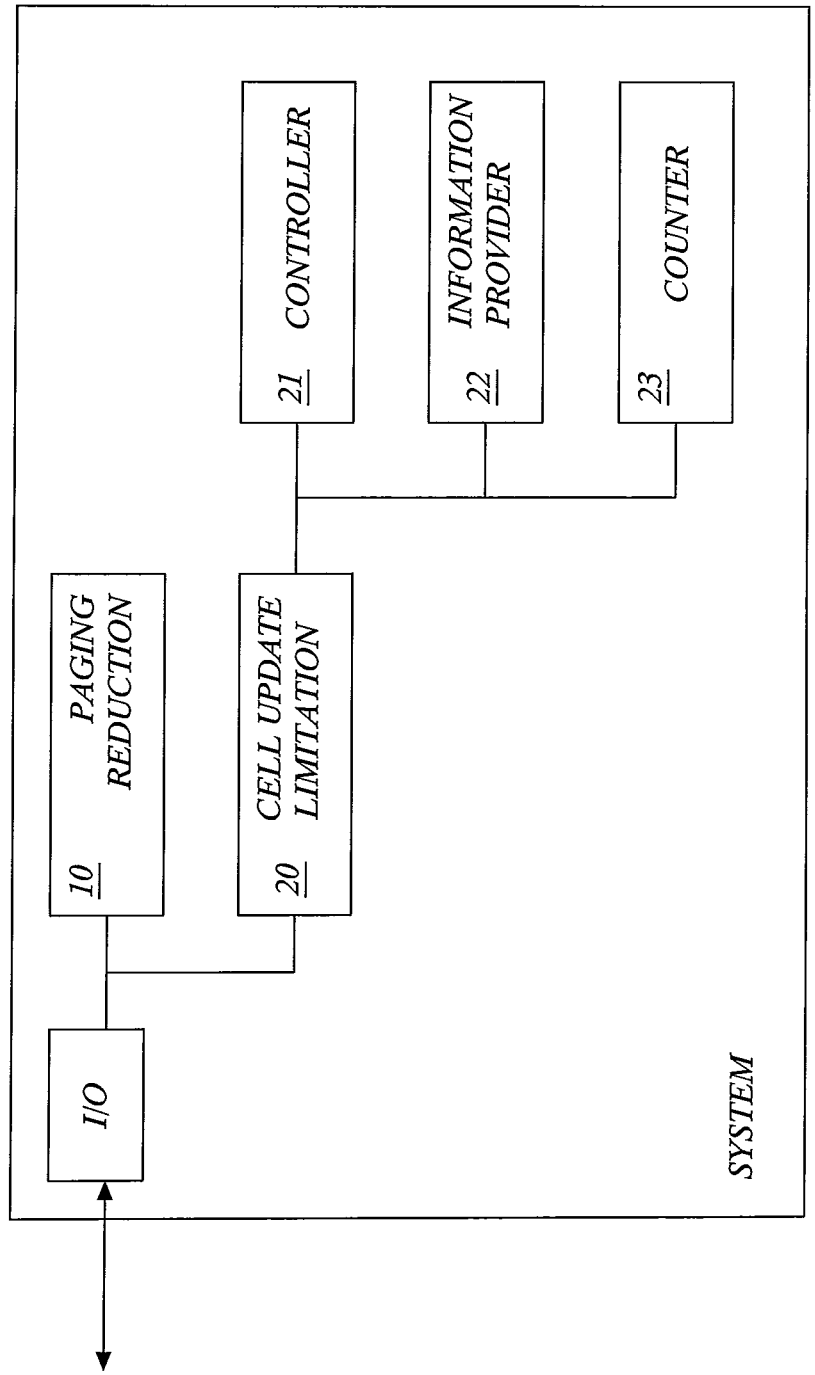
FIG. 10 is a schematic illustration of an embodiment of a system according to the invention.

An embodiment of a system or arrangement for implementing the above described method will be described with reference to FIG. 10.

The system basically comprises means 10 for reducing mandatory paging signalling from said mobile terminals and said network, by maintaining said network and said mobile terminals in an active state, and means 20 for limiting cell update signalling in response to one of said plurality of mobile terminal moving from one cell to a new cell. In addition, the system comprises controlling units 21 for determining whether a new cell comprises an active radio channel for said multicast session. This is preferably performed by looking up the MM context of the mobile terminal or the network to get access to the information. In addition, the system comprises an information unit 22 for providing information identifying which cells are participating in the multicast session, and a counter unit 23 for counting the number of subscribing mobile terminals in each participating cell.

The above-mentioned information in the MM or MBMS context is preferably kept updated by means for periodically counting the number of subscribing mobile terminals in each participating cell, and updating the information. As mentioned before, the information is maintained in the extended MM context, or MBMS context according to the invention.

The various means of the above described system can be implemented in the mobile terminals, the various nodes of the network or at a remote location. The main issue is to enable maintaining information concerning what cells are participating in the multicast session, and the number of mobile terminals associated with each participating cell, and utilizing that information to limit the cell updated procedure.

Advantages of the present invention comprise:
PMR/PSR service latency is decreased due to the novel handling of MM states;
less UL traffic, since the cell update signalling is limited;
efficient group conversation services in large groups (over multicast) due to the prevention of congestion or ultimately blocking.

It will be understood by those skilled in the art that various modifications and changes may be made to the present invention without departure from the scope thereof, which is defined by the appended claims.

REFERENCES

[1] 3GPP TSG RAN, "Introduction of the Multimedia Broadcast Multicast Service (MBMS) in the RAN Stage 2 (Release 6)", June 2006.
[2] 3GPP TSG GSM/EDGE Radio Access Network, "Multimedia Broadcast Multicast Service (MBMS) in the GERAN stage 2 (Release 6)", TS 43.246 v6.6.0, November 2005.

The invention claimed is:

1. A method of enabling improved group communication for a plurality of mobile terminals participating in a multicast session in a communication network comprising a plurality of cells and at least two base station systems with corresponding cell coverage, said method comprising:
reducing mandatory paging signaling from said mobile terminals and said network, by maintaining said network and said mobile terminals in an active state; and
limiting cell update signaling in response to one of said plurality of mobile terminals moving from one cell to a new cell, wherein the cell update signaling is used by the one of said plurality of mobile terminals to establish an active channel in the new cell.

2. The method according to claim 1, wherein said reducing step comprises maintaining each of said plurality of mobile terminals in a Ready State.

3. The method according to claim 1, wherein said limiting step comprises the further steps of in response to at least one of said plurality of mobile terminals entering a new cell in the communication system, determining whether said cell has an active radio channel for said multicast session; and
if said cell has an active radio channel for said multicast session, foregoing performing a cell update procedure; or
if said cell does not have an active radio channel for said multicast session, performing a cell update procedure and establishing an active radio channel for said multicast session in said new cell.

4. The method according to claim 3, wherein establishing said active radio channel comprises said mobile terminal requesting setup of the multicast session in said new cell after said cell update procedure.

5. The method according to claim 3, wherein establishing said active radio channel comprises said network setting up said multicast session in said new cell after said cell update procedure.

6. The method according to claim 3, wherein said mobile terminal performs the cell update procedure only if said new cell is not part of said multicast session.

7. The method according to claim 3, wherein said least one mobile terminal joins said active radio channel in said multicast session in said new cell if said cell is already participating in said multicast session.

8. The method according to claim 3, wherein said determining step comprises determining whether said cell is included in a provided list of all current cells participating in said multicast session and a last known number of mobile terminals participating in said multicast session in each participating cell.

9. The method according to claim 2, wherein said maintaining step comprises setting a Ready timer for said multicast session and maintaining said mobile terminal in a Ready state until the timer expires, wherein said timer is reset upon arrival of new data.

10. The method according to claim 2, wherein said maintaining step comprises transmitting dummy messages from said mobile terminal if an idle data timer has expired for the multicast session.

11. The method according to claim 1, further comprising periodically counting the number of mobile terminals participating in the multicast session within a cell, to determine whether any participating mobile terminals are within the cell.

12. The method according to claim 11, further comprising performing said counting if a known number of participating mobile terminals for that cell is below a predetermined first threshold.

13. The method according to claim 11, further comprising performing said counting for each participating cell.

14. The method according to claim 12 further comprising performing said counting for neighboring cells if said known number of mobile terminals is below a predetermined second threshold.

15. The method according to claim 1, further comprising performing paging or location update procedures if the multicast session has been idle and no data has been transmitted for a given time period.

16. The method according to claim 15, wherein said location update procedure comprises said mobile terminals transmitting dummy messages and said network responding with counting.

17. The method according to claim 1, wherein said network in response to receiving multiple cell updates for a same cell from participating mobile terminals performs a multicast session update procedure to inform all participating mobiles that said new cell is also available.

18. A system comprising one or more nodes in a communication network and configured to enable improved group communication for a plurality of mobile terminals participating in a multicast session in the communication network, which comprises a plurality of cells and at least two base station systems with corresponding cell coverage, said system configured to:
reduce mandatory paging signaling from said mobile terminals and said network, by maintaining said network and said mobile terminals in an active state; and
limit cell update signaling in response to one of said plurality of mobile terminals moving from one cell to a new cell, wherein the cell update signaling is used by the one of said plurality of mobile terminals to establish an active channel in the new cell.

19. The system according to claim 18, wherein the system is configured to determine whether a new cell has an active radio channel for said multicast session.

20. The system according to claim 18, wherein the system is configured to provide information identifying which cells are participating in the multicast session, and the number of subscribing mobile terminals in each participating cell.

21. The system according to claim 20, wherein the system is configured to periodically count the number of subscribing mobile terminals in each participating cell, and update the information accordingly.

22. The system according to claim 20, wherein said system includes or otherwise controls a Mobility Management (MM) context and a Multimedia Broadcast Multicast Service (MBMS) context.

* * * * *